(12) United States Patent
Miyamoto (10) Patent No.: US 11,338,753 B2
(45) Date of Patent: May 24, 2022

(54) INFORMATION PROCESSING APPARATUS, INFORMATION PROCESSING METHOD, AND PROGRAM

(71) Applicant: NEC Corporation, Tokyo (JP)

(72) Inventor: Shinichi Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 49 days.

(21) Appl. No.: 16/958,451

(22) PCT Filed: Dec. 28, 2017

(86) PCT No.: PCT/JP2017/047301
§ 371 (c)(1),
(2) Date: Jun. 26, 2020

(87) PCT Pub. No.: WO2019/130562
PCT Pub. Date: Jul. 4, 2019

(65) Prior Publication Data
US 2021/0053523 A1 Feb. 25, 2021

(51) Int. Cl.
*B60R 21/015* (2006.01)
*B60N 2/00* (2006.01)
*G01G 19/414* (2006.01)

(52) U.S. Cl.
CPC ............ *B60R 21/015* (2013.01); *B60N 2/002* (2013.01); *G01G 19/4142* (2013.01)

(58) Field of Classification Search
CPC ... B60R 21/015; B60N 2/002; G06K 9/00838
See application file for complete search history.

(56) References Cited

U.S. PATENT DOCUMENTS 6,801,662 B1 * 10/2004 Owechko ........... G06K 9/00201
382/103
7,558,772 B2 * 7/2009 Aboutalib ............. G06N 7/005
706/52
(Continued)

FOREIGN PATENT DOCUMENTS

JP 2007-216920 A 8/2007
JP 2012-128862 A 7/2012
(Continued)

OTHER PUBLICATIONS

International Search Report of PCT Application No. PCT/JP2017/047301 dated Feb. 6, 2018.
(Continued)

*Primary Examiner* — James A English (57) ABSTRACT

An information processing apparatus (10) includes a computation unit (110), a selection unit (120), and a processing unit (130). The computation unit (110) analyzes a sensing result acquired by sensing a vehicle running on a road, and thereby computes the number of occupants in the vehicle and a certainty factor of the number of the occupants. As one example, the computation unit (110) computes reliability in the case of determining that a person exists related to each seat of the vehicle, and uses the reliability for each seat to compute a certainty factor related to each possible number as the number of the occupants in the vehicle. The selection unit (120) selects a sensing result with the computed certainty factor of the number of occupants which does not satisfy a predetermined criterion as an analysis result. The processing unit (130) allows the sensing result selected by the selection unit (120) to be in the state of being distinguishable from the other sensing results.

6 Claims, 6 Drawing Sheets

(56) References Cited

U.S. PATENT DOCUMENTS

| | | | |
|---|---|---|---|
| 7,636,479 B2* | 12/2009 | Luo | G06K 9/00362 |
| | | | 382/103 |
| 2003/0169906 A1* | 9/2003 | Gokturk | G06K 9/00362 |
| | | | 382/115 |
| 2009/0309974 A1 | 12/2009 | Agrawal et al. | |
| 2012/0147194 A1 | 6/2012 | Wang et al. | |
| 2015/0278617 A1 | 10/2015 | Oami | |
| 2015/0294144 A1* | 10/2015 | Konishi | G06K 9/00255 |
| | | | 382/103 |
| 2016/0239714 A1 | 8/2016 | Oami et al. | |
| 2019/0018411 A1* | 1/2019 | Herbach | B60R 22/48 |
| 2020/0234067 A1* | 7/2020 | Hayashi | G06K 9/00785 |
| 2020/0250411 A1* | 8/2020 | Hayashi | G06K 9/00791 |

FOREIGN PATENT DOCUMENTS

| | | |
|---|---|---|
| WO | 2014/064898 A1 | 5/2014 |
| WO | 2015/052896 A1 | 4/2015 |

OTHER PUBLICATIONS

Extended European Search Report for EP Application No. EP17936197.7 dated Dec. 3, 2020.
Wikipedia, "Bayesian network" Dec. 18, 2017 (Dec. 18, 2017), XP055753562, Retrieved from the Internet: URL:https://en.wikipedia.org/w/index.php?t itle=Bayesian network&oldid=815922451.
Japanese Office Action for JP Application No. 2019-562690 dated Apr. 20, 2021 with English Translation.

* cited by examiner

FIG. 6 EXAMPLE OF PROPAGATION IN SEAT A

INFORMATION PROCESSING APPARATUS, INFORMATION PROCESSING METHOD, AND PROGRAM

This application is a National Stage Entry of PCT/JP2017/047301 filed on Dec. 28, 2017, the contents of all of which are incorporated herein by reference, in their entirety.

TECHNICAL FIELD

The present invention relates to a technique for computing the number of occupants in a vehicle.

BACKGROUND ART

There is a road having a dedicated lane in which a vehicle in which the number of occupants is equal to or more than a specified number is preferentially treated, such as a high-occupancy vehicle (HOV) lane and a high-occupancy toll (HOT) lane. A technique for computing the number of occupants in a vehicle running a dedicated lane has been desired in order to determine whether preferential treatment is applicable or not.

One example of the technique for computing the number of occupants in a vehicle is disclosed in the following PTL 1. As the technique of the following PTL 1, a technique is disclosed with which a seat control apparatus recognizes boarding counts using various types of information, such as an analysis result of an image generated by an in-vehicle camera, an analysis result of a voice collected by an in-vehicle microphone, and a result of communication with a portable telephone in a vehicle.

CITATION LIST

Patent Literature

[PTL 1] Japanese Unexamined Patent Application Publication No. 2007-216920

SUMMARY OF INVENTION

Technical Problem

When a computer computes the number of occupants in a vehicle, an error may occur in the result of the computation. Therefore, whether the result of the computation of the number of occupants by the computer is right or wrong may be confirmed by visual observation by a human. However, information handled by a computer for computing the number of occupants in a vehicle is commonly enormous, and it is not practical to confirm the whole information by man power. A technique for narrowing down a subject to be visually confirmed in accordance with any criteria is desired.

The present invention was accomplished in view of the problems described above. One of the objects of the present invention is to provide a technique for narrowing down information to be visually confirmed by a human among information processed for computing the number of occupants in a vehicle by a computer.

Solution to Problem

According to the present invention,
there is provided an information processing apparatus including:

a computation unit that analyzes a sensing result acquired by sensing a vehicle running on a road, and thereby computing the number of occupants in the vehicle and a certainty factor of the number of the occupants;

a selection unit that selects the sensing result with the computed certainty factor of the number of occupants which does not satisfy a predetermined criterion as an analysis result; and a processing unit that allows the sensing result selected by the selection unit to be in a state of being distinguishable from the other sensing result, in which the computation unit
computes reliability in a case in which it is determined that a person exists on each seat of the vehicle, and
computes a certainty factor related to each case of the possible number of the occupants in the vehicle using the reliability for each seat.

According to the present invention,
there is provided an information processing method executed by at least one computer, the method including:

analyzing a sensing result acquired by sensing a vehicle running on a road, and thereby
computing the number of occupants in the vehicle,
computing reliability in a case in which it is determined that a person exists on each seat of the vehicle, and
computing a certainty factor related to each case of the possible number of the occupants in the vehicle using reliability for each seat, selecting the sensing result with the computed certainty factor of the number of occupants which does not satisfy a predetermined criterion as an analysis result, and
allowing the selected sensing result to be in a state of being distinguishable from the other sensing result.

According to the present invention, there is provided a program that allows a computer to execute the information processing method described above.

Advantageous Effects of Invention

According to the present invention, there is provided a technique for narrowing down information to be visually confirmed by a human among information processed for computing the number of occupants in a vehicle by a computer

BRIEF DESCRIPTION OF DRAWINGS

The objects described above, other objects, features, and advantages will be further clear from the description of preferred example embodiments described below with reference to the following attached drawings.

DESCRIPTION OF EMBODIMENTS

Example embodiments of the present invention will be described below with reference to the drawings. In all the drawings, similar components are denoted by similar reference characters, and the descriptions thereof will not be repeated as appropriate. Moreover, in each block diagram, each block represents the configuration of a functional unit rather than the configuration of a hardware unit, unless otherwise stated.

Example Embodiment

[Outline]

Figure 1:
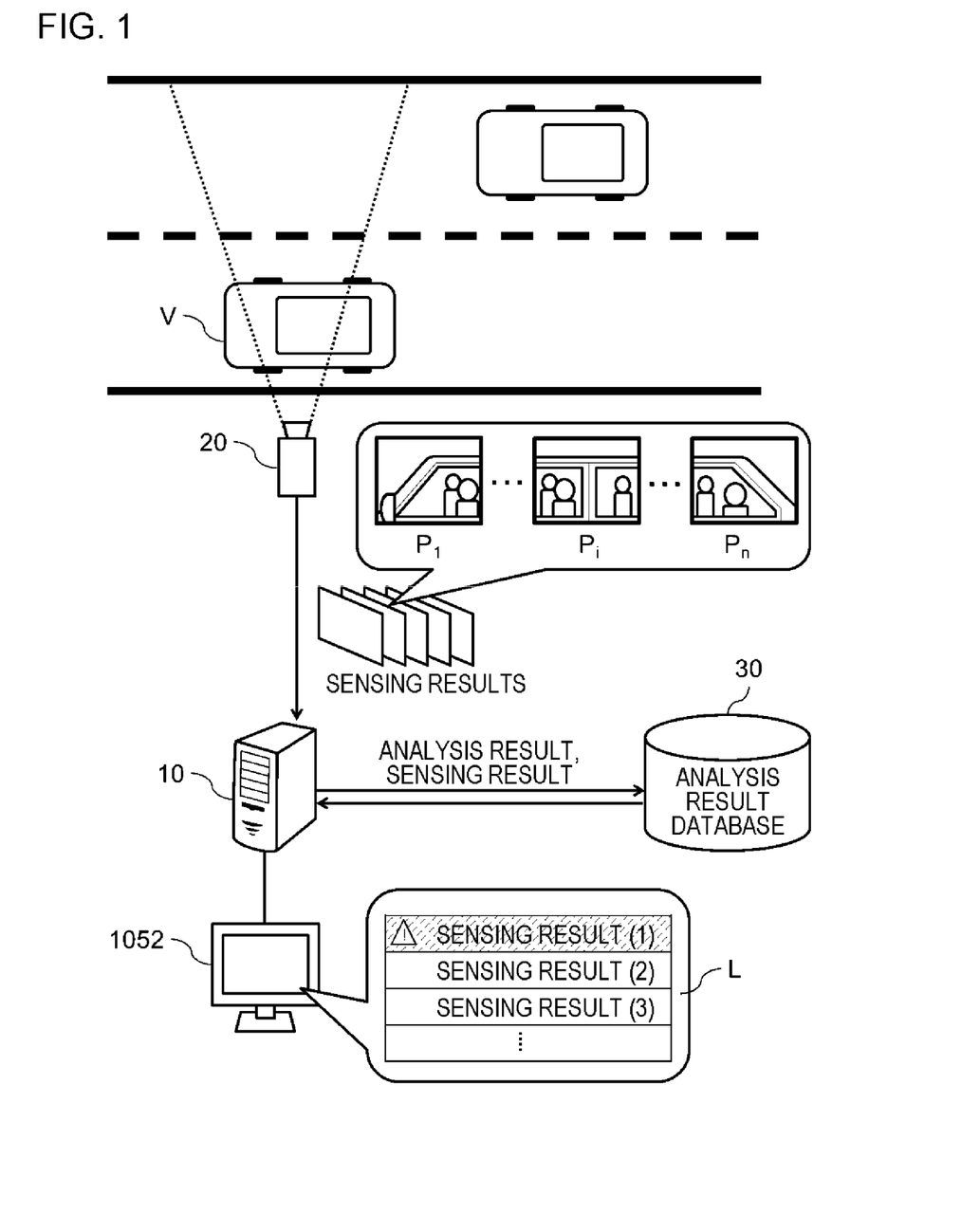
FIG. 1 is a diagram that conceptually illustrates an operation of an information processing apparatus according to the present invention.

FIG. 1 is a diagram conceptually illustrating the operating of an information processing apparatus 10 according to the present invention. Note that, FIG. 1 is a mere illustration for the purpose of facilitating understanding of the operation of the information processing apparatus 10. Thus, the operation of the information processing apparatus 10 is not limited at all by FIG. 1.

The operation of the information processing apparatus 10 includes at least an occupant number computation phase and an analysis result confirmation phase. Each phase will be schematically described below.

<Occupant Number Computation Phase>

In the occupant number computation phase, first, the information processing apparatus 10 acquires the sensing result of a vehicle V. The sensing result of the vehicle V is generated by a sensing apparatus 20 such as a camera, a microphone, or a millimeter wave radar. Note that, the sensing apparatus 20 illustrated in FIG. 1 is a camera. The sensing result in this case is an image of the vehicle V. In an example of FIG. 1, the sensing apparatus 20 generates images $P_1$ to $P_n$ acquired by capturing the vehicle V from a side. The information processing apparatus 10 computes the number of occupants in the vehicle V and the certainty factor of the number of the occupants by analyzing the acquired sensing result of the vehicle V. The information processing apparatus 10 stores the computed number of the occupants in the vehicle V and the computed certainty factor of the number of the occupants (analysis results) in a predetermined analysis result database 30 in association with the sensing result used in the analysis. Note that, the analysis result database 30 is constructed in the information processing apparatus 10 or an external apparatus (not illustrated) communicable with the information processing apparatus 10.

<Analysis Result Confirmation Phase>

In the analysis result confirmation phase, the information processing apparatus 10 selects a sensing result associated with a certainty factor that does not satisfy a predetermined criterion with reference to the database 30. The information processing apparatus 10 allows the selected sensing result to be in the state of being distinguishable from another sensing result (a sensing result associated with a certainty factor satisfying a criterion). For example, the information processing apparatus 10 can display a list L as illustrated in FIG. 1. In the list illustrated in FIG. 1, a special mark is placed on the sensing result selected by the information processing apparatus 10. In the list illustrated in FIG. 1, the background color of a row corresponding to the sensing result selected by the information processing apparatus 10 is different from the background color of a row corresponding to the other sensing results.

In accordance with the information processing apparatus 10 according to the present invention, a certainty factor is computed. Further, when a certainty factor computed by processing a certain sensing result by the information processing apparatus 10 does not satisfy a criterion determined in advance, the sensing result is allowed to be in the state of being distinguishable from another sensing result. A case in which "the certainty factor computed by the information processing apparatus 10 does not satisfy the criterion" means that, i.e., "the error of the result of processing by the information processing apparatus 10 is presumed to occur at equal to or more than a predetermined probability". Accordingly, the present example embodiment allows the sensing result (subject to be confirmed by man power) associated with the certainty factor that does not satisfy the criterion to be recognized at a glance by a confirmation operator.

[Function Configuration Example]

Figure 2:
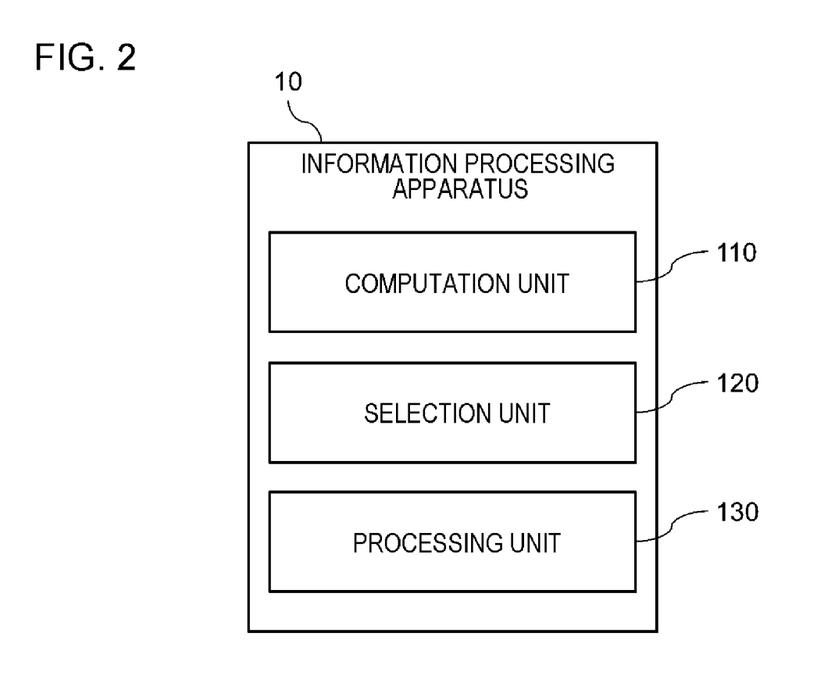
FIG. 2 is a block diagram conceptually illustrating a functional configuration of the information processing apparatus.

FIG. 2 is a block diagram conceptually illustrating the functional configuration of the information processing apparatus 10. As illustrated in FIG. 2, the information processing apparatus 10 includes a computation unit 110, a selection unit 120, and a processing unit 130.

The computation unit 110 analyzes a sensing result acquired by sensing a vehicle running on a road, thereby computing the number of occupants in the vehicle and the certainty factor of the number of the occupants. The selection unit 120 selects a sensing result with the computed certainty factor of the number of occupants which does not satisfy a predetermined criterion as an analysis result. The processing unit 130 allows the sensing result selected by the selection unit 120 to be in the state of being distinguishable from the other sensing results.

[Hardware Configuration Example]

Each functional configuration unit of the information processing apparatus 10 may be implemented by hardware (for example, a hard-wired electronic circuit or the like) implementing each functional configuration unit, or may be implemented by a combination of hardware and software (for example, a combination of an electronic circuit and a program controlling the electronic circuit, or the like). A case in which each functional configuration unit of the information processing apparatus 10 is implemented by a combination of hardware and software will be further described below.

Figure 3:
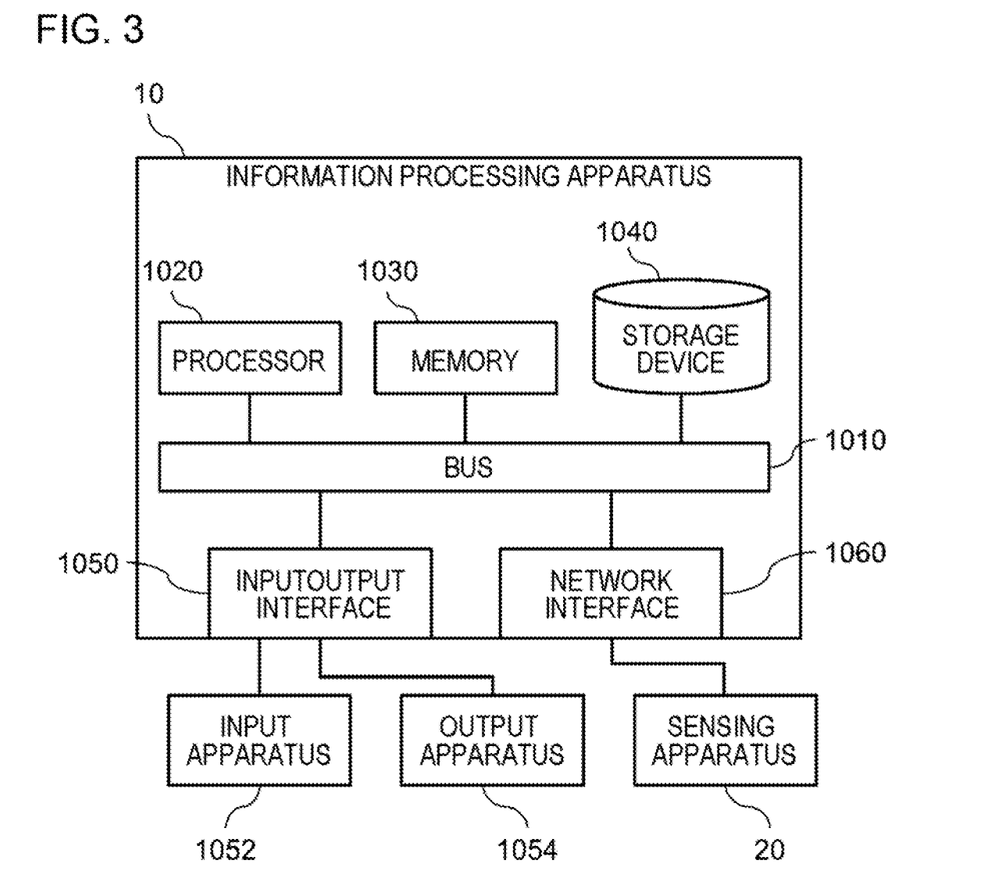
FIG. 3 is a block diagram illustrating a hardware configuration of the information processing apparatus.

FIG. 3 is a block diagram illustrating the hardware configuration of the information processing apparatus 10. The information processing apparatus 10 includes a bus 1010, a processor 1020, a memory 1030, a storage device 1040, an input-output interface 1050, and a network interface 1060.

The bus 1010 is a data transmission line through which the processor 1020, the memory 1030, the storage device 1040, the input-output interface 1050, and the network interface 1060 mutually transmit and receive data. However, a method of connecting the processor 1020 and the like to each other is not limited to bus connection.

The processor 1020 is a processor implemented by a CPU (central processing unit), a GPU (graphics processing unit), or the like.

The memory 1030 is a main memory configured with a RAM (random access memory), or the like.

The storage device 1040 is a secondary storage device configured with an HDD (hard disk drive), an SSD (solid state drive), a memory card, a ROM (read only memory), or the like. The storage device 1040 stores a program module implementing each function (the computation unit 110, the selection unit 120, the processing unit 130, or the like) of the information processing apparatus 10. The processor 1020 reads each of the program modules on the memory 1030, and executes the program modules, to implement each function corresponding to each program module. The storage device 1040 can be used as a storage area for the analysis result database 30.

The input-output interface 1050 is an interface for connection between the information processing apparatus 10 and various input/output devices. For example, an input device 1052 such as a mouse or a keyboard and an output device 1054 such as a display or a speaker are connected to the input-output interface 1050.

The network interface 1060 is an interface for connecting the information processing apparatus 10 to a network. The network is, for example, a LAN (local area network) or a WAN (wide area network). A method of the network interface 1060 connecting to the network may be wireless connection or wireline connection. The information processing apparatus 10 is connected communicably to, for example, an external apparatus such as the sensing apparatus 20 via the network interface 1060.

Note that, the hardware configuration illustrated in FIG. 3 is merely an example, and the hardware configuration of the information processing apparatus 10 according to the present invention is not limited thereto.

[Flow of Processes]

Figure 4:
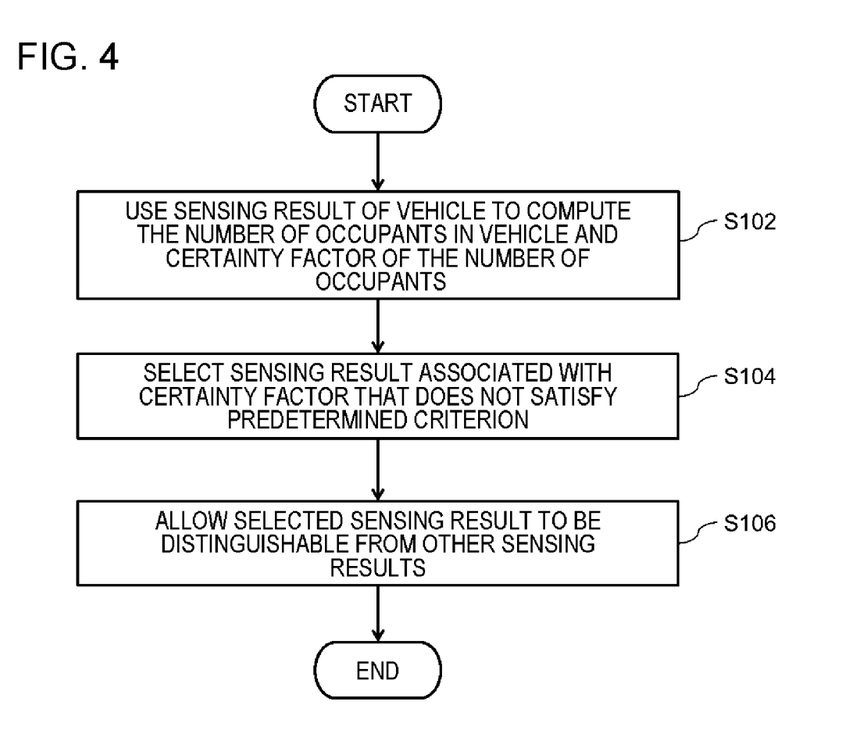
FIG. 4 is a flow chart illustrating the flow of processes executed by the information processing apparatus.

The flow of processes executed by the information processing apparatus 10 will be described below. FIG. 4 is a flow chart illustrating the flow of the processes executed by the information processing apparatus 10. The computation unit 110 uses the sensing result of a vehicle generated by the sensing apparatus 20 to compute the number of occupants in the vehicle and the certainty factor of the number of the occupants (S102). The computation unit 110 stores the number of the occupants in the vehicle and the certainty factor of the number of the occupants in the analysis result database 30 in association with the sensing result used when they are computed. Note that, the analysis result database 30 is prepared on, for example, the storage device 1040. The selection unit 120 selects a sensing result associated with a certainty factor that does not satisfy a predetermined criterion (S104). As an example, the predetermined criterion is a threshold value set in advance for a certainty factor, and is stored in, for example, the storage device 1040 in advance. In this case, the selection unit 120 reads out the threshold value from the storage device 1040, and compares the threshold value and a certainty factor associated with each sensing result. As the result of the comparison, the selection unit 120 determines a sensing result associated with a certainty factor that is less than the threshold value. The processing unit 130 allows the sensing result selected by the selection unit 120 to be distinguishable from the other sensing results (S106). For example, the processing unit 130 places a predetermined mark on a sensing result associated with a certainty factor that does not satisfy a criterion, and changes the background color of a row corresponding to the sensing result, as indicated by the list L of FIG. 1. As a result, the sensing result associated with the certainty factor that does not satisfy the criterion becomes distinguishable from the other sensing results. The processing unit 130 may be configured so that the mark or the background color is changed depending on the divergence degree between the certainty factor computed by the computation unit 110 and the predetermined criterion.

Note that, the operation of the selection unit 120 and the processing unit 130 can be started in response to input operation for executing a process (for example, a press of a button prepared on an operation screen which is not illustrated, or the like) performed by an operator of the information processing apparatus 10. The selection unit 120 may automatically start operation according to, e.g., a schedule set in advance, without depending on input operation for executing a process performed by an operator.

The operation of the computation unit 110 will be described in more detail below.

<Computation of Reliability>

The computation unit 110 uses the sensing result of a vehicle generated by the sensing apparatus 20 to compute reliability in the case of determining that a person exists for each seat of the vehicle. For example, when the sensing apparatus 20 is an imaging apparatus, the computation unit 110 can acquires, as sensing results to be analyzed, a plurality of frame images acquired by capturing by one imaging apparatus or a plurality of images acquired by capturing from different angles by two or more imaging apparatuses. When a plurality of images are used, the integration of processing results in each image is required for computing the number of occupants. For example, it is necessary to determine whether or not a person counted by processing a certain image exists in another image, and whether or not a person who has not yet been counted exists in an image to be processed. The computation unit 110 can compute the final number of occupants on the basis of processing results in a plurality of images using a function that integrates the processing results in each image (hereinafter, referred to as "integration function"). Specific examples of the integration function include, but are not particularly limited to, a function that determines an identical person on the basis of the traveling distance of a vehicle, a function that determines an identical person on the basis of a distance between regions which are determined to be a person in an image, a function that determines whether or not to be an occupant in a vehicle on the basis of whether the coordinate of a region which is determined to be the face of a person in an image is in or outside the vehicle, a function that determines whether or not to be an occupant in a vehicle on the basis of a difference from the average value of the heights of the faces of persons, a function that applies a process of determining whether or not to be a headrest to a region which is determined to be a face by a face detection process, and a function that computes a face detection score (probability as face) and the number of times of detection of faces.

Figure 5:
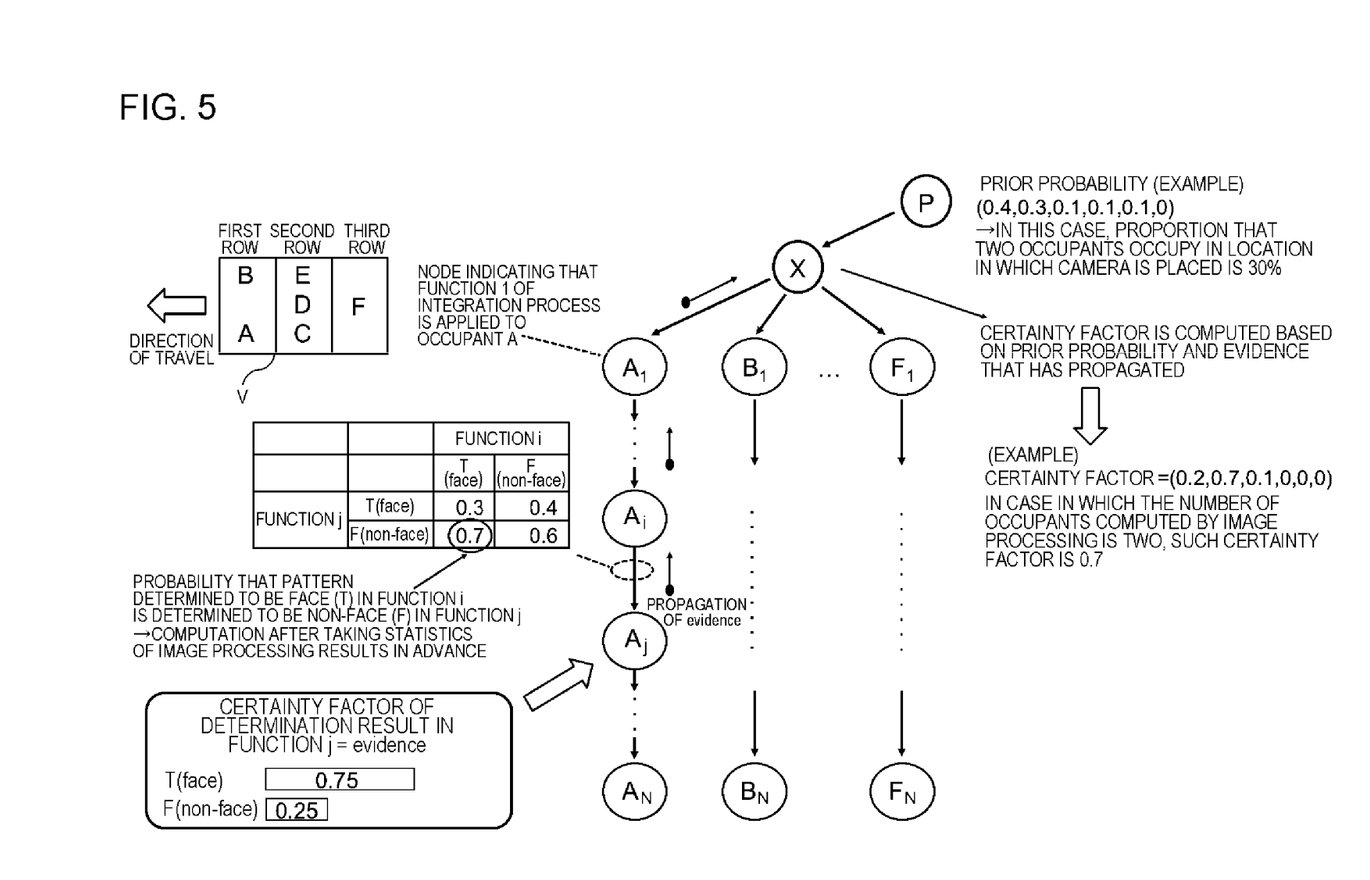
FIG. 5 is a diagram conceptually illustrating the flow of computing reliability for each seat of a vehicle by a computation unit.

An example of the flow of computing reliability for each seat of a vehicle by the computation unit 110 will be described with reference to FIG. 5. FIG. 5 is a diagram conceptually illustrating the flow of computing reliability for each seat of a vehicle by the computation unit 110. Note that, FIG. 5 illustrates a case in which the certainty factors of up to six occupants are computed.

BBN (Bayesian belief network) is drawn in FIG. 5. In the BBN, a node $A_i$ (i=1, 2, . . . N; N is the total number of integration functions) indicates that one function i of the integration functions as described above is applied to a seat A in a vehicle. Similarly, nodes $B_i$, $C_i$, $D_i$, $E_i$, and $F_i$ also indicate that the function i is applied to seats B to F in a vehicle, respectively. Note that, FIG. 5 illustrates, for brief descriptions, an example in which the nodes for each seat are connected in line form. However, the form of the BBN is not limited to the line form. The form of the BBN may be configured in, for example, tree form depending on the relationship of integration functions. A node P indicates a prior probability. The prior probability applied to the node P is computed in advance based on, for example, the statistics of the numbers of occupants of in vehicles passing through a location in which the sensing apparatus 20 is installed. A node X indicates a scheme in which a certainty factor for each possible number as the number of occupants in a vehicle is computed using reliability given from nodes $A_1$ to $F_1$ for each seat and the prior probability applied to the node P. The scheme in which a certainty factor for each possible number as the number of occupants in a vehicle is computed will be described later.

The computation unit 110 computes, for example, reliability for each seat as described below, using BBN (Bayesian belief network) as illustrated in FIG. 5. First, the computation unit 110 computes reliability, at which it is determined that a person exists, for each node using a function corresponding to each node. When a process in a certain subordinate node has been completed to compute reliability, the reliability (which is also referred to as "evidence") computed in the subordinate node propagates to the adjacent host node. As a specific example, it is assumed that the function of the subordinate node is "a function that determines whether or not to be an occupant on the basis of whether the coordinate of a region which is determined to be the face of a person in an image is in or outside a vehicle". In this case, the computation unit 110 computes a negative (no person exists) evidence to a greater degree and a positive (a person exists) evidence to a less degree when it is determined that a region which is determined to be a face is outside the vehicle. The computation unit 110 computes a negative (no person exists) evidence to a less degree and a positive (a person exists) evidence to a greater degree when it is determined that a region which is determined to be a face is in the vehicle. As another example, it is assumed that the function of the subordinate node is "it is determined whether or not to be an occupant in a vehicle on the basis of a difference from the average value of the heights of the faces of persons". In this case, the computation unit 110 computes a negative (no person exists) evidence to a greater degree and a positive (a person exists) evidence to a less degree when, as the result of a comparison between the height of the face of a person detected in an image and the average value of the heights of the faces of persons, the comparison result is greater than a permitted value that has been predetermined. The computation unit 110 computes a negative (no person exists) evidence to a less degree and a positive (a person exists) evidence to a greater degree when, as the result of a comparison between the height of the face of a person detected in an image and the average value of the heights of the faces of persons, the comparison result is equal to or less than the permitted value that has been predetermined. As another example, it is assumed that the function of the subordinate node is "a function that applies a process of detecting whether or not to be a headrest to a region which is determined to be a face by a face detection process". In this case, the computation unit 110 computes a negative (no person exists) evidence to a greater degree and a positive (a person exists) evidence to a less degree when a region which is determined to be a face by a face detection process is determined to be a headrest by headrest detection. The computation unit 110 computes a negative (no person exists) evidence to a less degree and a positive (a person exists) evidence to a greater degree when a region which is determined to be a face by a face detection process is not determined to be a headrest by headrest detection. As another example, the function of the subordinate node is "a function that computes a face detection score (probability as face) and the number of times of detection of faces". In this case, the computation unit 110 computes a negative (no person exists) evidence to a greater degree and a positive (a person exists) evidence to a less degree when a face detection score and the number of times of detection of faces are less than an expected value that has been predetermined. The computation unit 110 computes a negative (no person exists) evidence to a less degree and a positive (a person exists) evidence to a greater degree when a face detection score and the number of times of detection of faces are equal to or more than the expected value that has been predetermined.

When an evidence propagates from a subordinate node, the computation unit 110 updates the reliability of a host node using the evidence propagating from the subordinate node. For example, correspondence relationships (likelihood distributions) as set forth in the table of FIG. 5 are predefined between a host node and a subordinate node in an example of FIG. 5. For example, a probability "0.7" set forth in the lower left of the table of FIG. 5 indicates a probability that a pattern determined as TRUE (a person exists) in the function $A_i$ is determined as FALSE (no person exists) in the function $A_j$. The probabilities set forth in the table are computed by, for example, taking statistics on the determination results of the function $A_i$ and the determination results of the node $A_j$ using data prepared in advance. The computation unit 110 can use such correspondence relationships to compute the probability (posterior probability) of determination in a host node in a case in which a determination result in a subordinate node is established. The computation unit 110 updates the reliability of a host node using an evidence propagating from a subordinate node in such a manner. As a result, final reliability for each seat is computed in a top node ($A_1$, $B_1$, $C_1$, $D_1$, $E_1$, or $F_1$) for each seat. Each reliability computed in the top node for each seat is used in a process of computing a certainty factor, described later.

Figure 6:
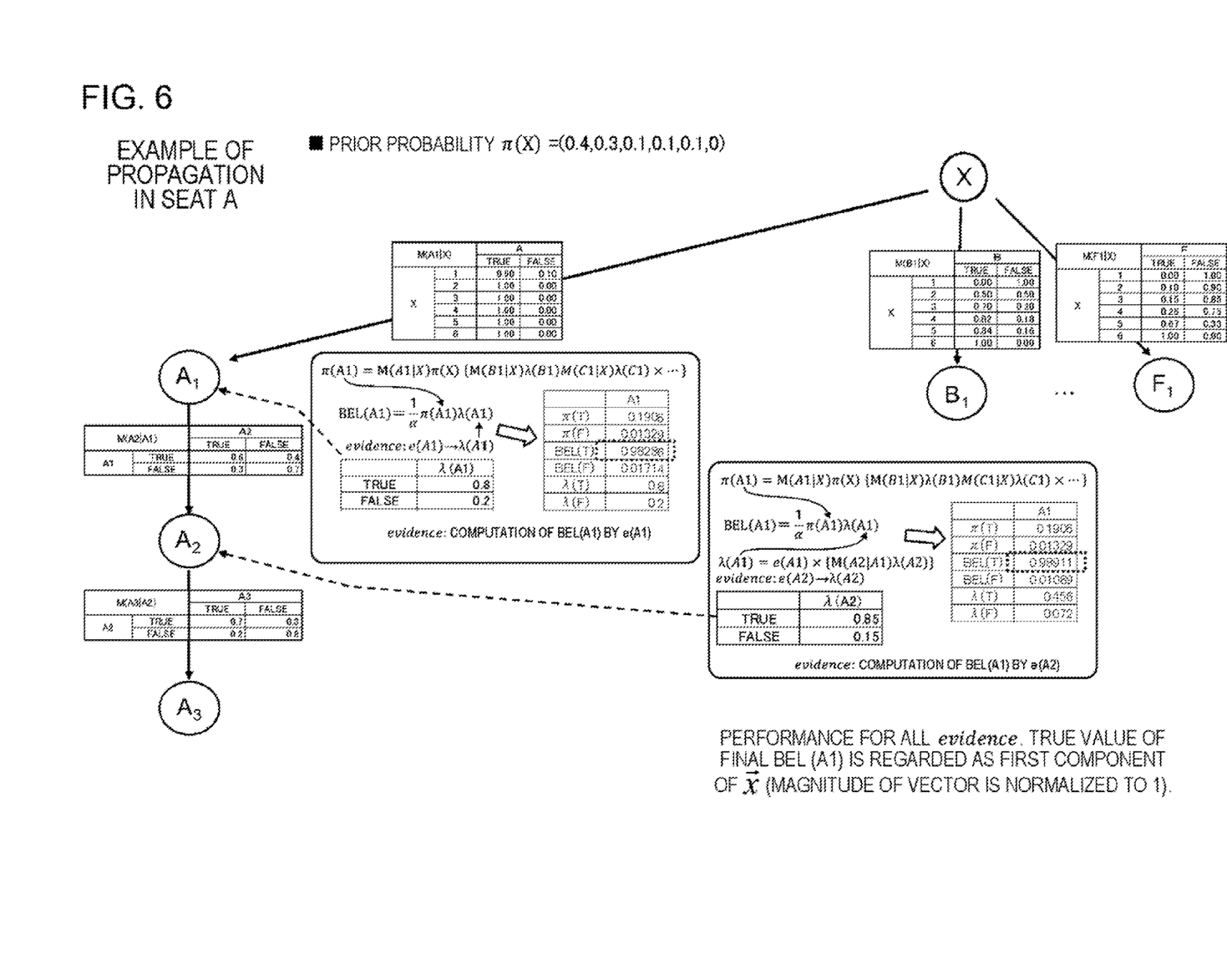
FIG. 6 is a diagram conceptually illustrating a scene in which the evidence of a subordinate node propagates through a host node.

An example of the flow of updating the reliability of a host node using the evidence of a subordinate node will be described with reference to FIG. 6. FIG. 6 is a diagram conceptually illustrating a scene in which the evidence of a subordinate node propagates to a host node. FIG. 6 illustrates the flow of recomputing the evidence $e_1$ of a host node $A_1$ using an evidence $e_2$ computed with the function of a subordinate node $A_2$. In FIG. 6, $\pi$ (A1) is a reliability propagation vector from a host node, and includes two components of $\pi$ (T) and $\pi$ (F). $\pi$ (T) represents a likelihood (plausibility) in view of the host node in a case in which a determination result in the node $A_1$ is True (a person exists). $\pi$ (F) represents a likelihood (plausibility) in view of the host node in a case in which a determination result in the node $A_1$ is False (no person exists). BEL (A1) is reliability computed in the node $A_1$, and includes two components of BEL (T) and BEL (F). BEL (T) represents reliability in which a determination result in the node $A_1$ is True (a person exists). BEL (F) represents reliability in which a determination result in the node $A_1$ is False (no person exists). $\alpha$ is a normalizing constant for allowing a probability sum to be 1. $\lambda$ (A1) is a reliability propagation vector from a subordinate node, and includes two components of $\lambda$ (T) and $\lambda$ (F). $\lambda$ (T) represents a likelihood (plausibility) in view of a subordinate node in a case in which a determination result in the node $A_1$ is True (a person exists). $\lambda$ (F) represents a likelihood (plausibility) in view of a subordinate node in a case in which a determination result in the node $A_1$ is False (no person exists). The computation unit 110 executes each computation between nodes as illustrated.

<Computation of Certainty Factor>

Then, a scheme in which a certainty factor is computed for each possible number as the number of occupants in a vehicle will be illustratively described using the reliability for each seat, computed as described above.

The computation unit 110 can compute a certainty factor for each possible number as the number of occupants in a vehicle using, for example, the following equation (1). The following equation (1) is an equation for computing the likelihood distribution of possible numbers as the number of occupants in vehicles.

[Math 1]

$$p(\vec{x}, n', \vec{\theta}|n) = \exp\left\{-\frac{\alpha_n^2(n'-n)^2 + \beta_n^2}{\sum_{k=1}^{n} \gamma_{n,k}^2 x_k}\left(1 + \sum_{k=n+1}^{N} \gamma_{n,k}^2 x_k\right)\right\} \quad (1)$$

In the equation (1), n is the true value of the number of occupants in a vehicle. Moreover, n' is the number (estimated value) of occupants computed by the computation unit 110. Moreover, x (in the present specification, an arrow representing a vector is omitted except mathematical equations; the same also applies for other vectors) is a vector including reliability for each node (seat) computed by the computation unit 110. N is the maximum number of occupants in a vehicle. Moreover, θ is a vector including three model parameters ($\alpha_i$, $\beta_i$, and $\gamma_{i,j}$) (1≤i, and j≤N). $\alpha_i$ is a weighting factor for a deviation between the true value of the number of occupants and the number (estimated value) of occupants computed by the computation unit 110. $\beta_i$ is an offset. $\gamma_{i,j}$ is a weighting factor for the evidence of each node. These model parameters are determined in advance by learning. Note that, a method of learning the model parameters will be described later.

The following equation (2) can be derived from the above-described equation (1) according to the Bayes' theorem. Note that, p (n) represents a prior probability in the following equation (2). For example, p (n) is computed in advance based on, e.g., the statistics of the numbers of occupants in vehicles passing through a location in which the sensing apparatus 20 is installed, and stored in advance in the storage device 1040 and the like. The following equation (2) represents a posterior probability in the case of giving the confidence value vector x of each node, the number n' of occupants computed by the computation unit 110, and a known parameter vector θ, i.e., a certainty factor. In other words, the following equation (2) indicates that a certainty factor can be computed for each true value n of the number of occupants in a vehicle (i.e., possible number as the number of occupants in a vehicle) using the likelihood distribution of the above-described equation (1) and the prior probability p (n).

[Math 2]

$$p(n|\vec{x}, n', \vec{\theta}) = \frac{p(\vec{x}, n', \vec{\theta}|n)p(n)}{\sum_{n=1}^{N} p(\vec{x}, n', \vec{\theta}|n)p(n)} \quad (2)$$

<Learning of Model Parameters>

The computation unit 110 can determine, for example, the model parameters $\alpha_i$, $\beta_i$, and $\gamma_{i,j}$ by determining such θ that an error function E (θ) indicated by the following equation (3) is minimized. In the following equation (3), $x^p$ and n' indicate learning data. Moreover, $t^p$ is the target value of the output of the equation (2) determined in advance.

[Math 3]

$$\sum_{p=1}^{P}\left\{p(n|\vec{x}^p, n', \vec{\theta}) - t^p\right\}^2 \equiv E(\vec{\theta}) \quad (3)$$

$$\vec{\theta} = (\alpha_n, \beta_n, \gamma_{n,k})(n, k = 1, \ldots, N)$$

Note that, such θ that the error function E (θ) is minimized can be determined by, for example, an update formula indicated by the following equation (4).

[Math 4]

$$\vec{\theta}^{(t+1)} = \vec{\theta}^{(t)} - \varepsilon\frac{\partial E(\vec{\theta}^{(t)})}{\partial \vec{\theta}^{(t)}} \quad (4)$$

$\theta^{(t)}$ represents θ acquired by t-th update.

Note that, the second term (partial derivative of error function E (θ) by θ) of the right side of the equation (4) described above is computed as the following equation (5).

[Math 5]

$$\frac{\partial E(\vec{\theta})}{\partial \vec{\theta}} = 2\sum_{P}\left\{p(n|\vec{x}^p, n', \vec{\theta}) - t^p\right\} \times \frac{\partial}{\partial \vec{\theta}} p(n|\vec{x}^p, n', \vec{\theta})$$

$$= 2\sum_{P}\left\{p(n|\vec{x}^p, n', \vec{\theta}) - t^p\right\} \times \frac{1}{\left\{\sum_n p(\vec{x}, n', \vec{\theta}|n)p(n)\right\}^2} \times$$

$$\left\{\underbrace{p(n)\frac{\partial}{\partial \vec{\theta}}p(\vec{x}^p, n', \vec{\theta}|n)}_{A} \times \sum_{R} p(\vec{x}^p, n', \vec{\theta}|n)p(n) - p(n)p(\vec{x}^p, n', \vec{\theta}|n) \times \underbrace{\frac{\partial}{\partial \vec{\theta}}\sum_{n} p(\vec{x}^p, n', \vec{\theta}|n)p(n)}_{B}\right\} \quad (5)$$

The model parameter θ in which the error function E (θ) is minimized is acquired by computing the portions of the underlines A and B of the equation (5) described above by considering separately such cases as described below.

Computation of A $\langle \theta = \alpha_m \rangle$ [Math. 6]

- In the case of
  $m \neq n$
  $A = 0$

- In the case of
  $m = n$ $$A = \frac{\partial}{\partial \alpha_m} p(\vec{x}^P, n', \vec{\theta} \mid n)$$

$$= \left\{ -\frac{2\alpha_n(n'-n)^2}{\sum_{k=1}^{n'} \gamma_{n,k}^2 x_k^p} \left(1 + \sum_{k=n'+1}^{N} \gamma_{n,k}^2 x_k^p \right) \right\} p(\vec{x}^P, n', \vec{\theta} \mid n)$$

$\langle \theta = \beta_m \rangle$

- In the case of
  $m \neq n$
  $A = 0$

- In the case of
  $m = n$ $$A = \frac{\partial}{\partial \beta_m} p(\vec{x}^P, n', \vec{\theta} \mid n)$$

$$= \left\{ -\frac{2\beta_n}{\sum_{k=1}^{n'} \gamma_{n,k}^2 x_k^p} \left(1 + \sum_{k=n'+1}^{N} \gamma_{n,k}^2 x_k^p \right) \right\} p(\vec{x}^P, n', \vec{\theta} \mid n)$$

$\langle \theta = \gamma_{m,k} \rangle$

- In the case of
  $m \neq n$
  $A = 0$

- In the case of
  $m = n$

In the case
  of $k \leq n'$ $$A = \frac{\partial}{\partial \gamma_{m,k}} p(\vec{x}^P, n', \vec{\theta} \mid n)$$

$$= \left[ \frac{2\gamma_{n,k} x_k^p}{\left(\sum_{k=1}^{n'} \gamma_{n,k}^2 x_k^p\right)^2} \{\alpha_m^2(n'-n)^2 + \beta_n^2\} \left(1 + \sum_{k=n'+1}^{N} \gamma_{n,k}^2 x_k^p \right) \right]$$

$$p(\vec{x}^P, n', \vec{\theta} \mid n)$$

In the case
  of $k > n'$ $$A = \frac{\partial}{\partial \gamma_{m,k}} p(\vec{x}^P, n', \vec{\theta} \mid n)$$

$$= \left\{ -\frac{\alpha_n^2(n-n')+\beta_n^2}{\sum_{k=1}^{n'} \gamma_{n,k}^2 x_k^p} \times 2\gamma_{n,k} x_k^p \right\} p(\vec{x}^P, n', \vec{\theta} \mid n)$$

Computation of B $\langle \theta = \alpha_m \rangle$ [Math. 7]

$$B = \frac{\partial}{\partial \alpha_m} \sum_n p(\vec{x}^P, n', \vec{\theta} \mid n) p(n)$$

$$= p(m) \left\{ -\frac{2\alpha_m(n-n')^2}{\sum_{k=1}^{n'} \gamma_{m,k}^2 x_k^p} \left(1 + \sum_{k=n'+1}^{N} \gamma_{m,k}^2 x_k^p \right) \right\} p(\vec{x}^P, n', \vec{\theta} \mid m)$$

$\langle \theta = \beta_m \rangle$ $$B = \frac{\partial}{\partial \beta_m} \sum_n p(\vec{x}^P, n', \vec{\theta} \mid n) p(n)$$

$$= p(m) \left\{ -\frac{2\beta_m}{\sum_{k=1}^{n'} \gamma_{m,k}^2 x_k^p} \left(1 + \sum_{k=n'+1}^{N} \gamma_{m,k}^2 x_k^p \right) \right\} p(\vec{x}^P, n', \vec{\theta} \mid m)$$

$\langle \theta = \gamma_{m,k} \rangle$

In the case
of $k \leq n'$ $$B = \frac{\partial}{\partial \gamma_{m,k}} \sum_n p(\vec{x}^P, n', \vec{\theta} \mid n) p(n)$$

$$= p(m) \left[ \frac{2\gamma_{n,k} x_k^p}{\left(\sum_{k=1}^{n'} \gamma_{n,k}^2 x_k^p\right)^2} \{\alpha_m^2(n'-n)^2 + \beta_n^2\} \left(1 + \sum_{k=n'+1}^{N} \gamma_{n,k}^2 x_k^p \right) \right]$$

$$p(\vec{x}^P, n', \vec{\theta} \mid m)$$

In the case
of $k > n'$ $$B = \frac{\partial}{\partial \gamma_{m,k}} \sum_n p(\vec{x}^P, n', \vec{\theta} \mid n) p(n)$$

$$= p(m) \left\{ -\frac{\alpha_m^2(n-n')^2 + \beta_m^2}{\sum_{k=1}^{n'} \gamma_{m,k}^2 x_k^p} \times 2\gamma_{m,k} x_k^p \right\} p(\vec{x}^P, n', \vec{\theta} \mid m)$$

The computation unit 110 stores the model parameter θ computed using the above-described equation in, for example, the storage device 1040 in the case in which the number of repetition of parameter optimization reaches the upper limit, or in a case in which the output of the error function E (θ) is equal to or less than a predetermined threshold value. The computation unit 110 can read out the model parameter θ stored in the storage device 1040 to execute computation when a certainty factor is computed.

The example embodiments of the present invention have been described with reference to the drawings. However, these are illustrations of the present invention, and various configurations other than the above can also be adopted.

Moreover, some or all of the example embodiments described above can also be described as the following supplementary notes, but are not limited thereto.

1. An information processing apparatus including:
   a computation unit that analyzes a sensing result acquired by sensing a vehicle running on a road, and thereby computing the number of occupants in the vehicle and a certainty factor of the number of the occupants;
   a selection unit that selects the sensing result with the computed certainty factor of the number of occupants which does not satisfy a predetermined criterion as an analysis result; and a processing unit that allows the sensing result selected by the selection unit to be in a state of being distinguishable from the other sensing result, in which the computation unit computes reliability in a case in which it is determined that a person exists on each seat of the vehicle, and computes a certainty factor related to each case of the possible number of the occupants in the vehicle using the reliability for each seat.

2. The information processing apparatus according to 1, in which the computation unit computes the reliability for each seat using a plurality of images acquired by capturing using at least one imaging apparatus.

3. The information processing apparatus according to 1 or 2, in which the computation unit computes the reliability for each seat using Bayesian belief network (BBN).

4. The information processing apparatus according to any one of 1 to 3, in which the computation unit converts a likelihood distribution acquired from the following equation (1) into a certainty factor using Bayes' theorem

[Math 8]

$$p(\vec{x}, n', \vec{\theta} \mid n) = \exp\left\{-\frac{\alpha_n^2(n'-n)^2 + \beta_n^2}{\sum_{k=1}^{n} \gamma_{n,k}^2 x_k}\left(1 + \sum_{k=n+1}^{N} \gamma_{n,k}^2 x_k\right)\right\} \quad (1)$$

in which n is a true value of the number of occupants in the vehicle, n' is the number of occupants in the vehicle computed by the computation unit, x (an arrow representing a vector is omitted) is the reliability for each seat, θ (an arrow representing a vector is omitted)=($\alpha_i$, $\beta_i$, $\gamma_{i,j}$) (1≤i, j≤N) is a model parameter and a constant, and N is the maximum number of occupants in the vehicle.

5. An information processing method executed by at least one computer, the method including:

analyzing a sensing result acquired by sensing a vehicle running on a road, and thereby computing the number of occupants in the vehicle, computing reliability in a case in which it is determined that a person exists on each seat of the vehicle, and computing a certainty factor related to each case of the possible number of the occupants in the vehicle using the reliability for each seat, selecting the sensing result with the computed certainty factor of the number of occupants which does not satisfy a predetermined criterion as an analysis result, and allowing the selected sensing result to be in a state of being distinguishable from the other sensing result.

6. The information processing method executed by the computer according to 5, the method further including:

allowing the computer to compute the reliability for each seat using a plurality of images acquired by capturing using at least one imaging apparatus.

7. The information processing method executed by the computer according to 5 or 6, the method further including:

allowing the computer to compute the reliability for each seat using BBN (Bayesian belief network).

8. The information processing method executed by the computer according to any one of 5 to 7, the method further including:

allowing the computer to convert a likelihood distribution acquired from the following equation (1) into a certainty factor using Bayes' theorem

[Math 9]

$$p(\vec{x}, n', \vec{\theta} \mid n) = \exp\left\{-\frac{\alpha_n^2(n'-n)^2 + \beta_n^2}{\sum_{k=1}^{n} \gamma_{n,k}^2 x_k}\left(1 + \sum_{k=n+1}^{N} \gamma_{n,k}^2 x_k\right)\right\} \quad (1)$$

in which n is a true value of the number of occupants in the vehicle, n' is the number of occupants in the vehicle computed by the computation unit, x (an arrow representing a vector is omitted) is the reliability for each seat, θ (an arrow representing a vector is omitted)=($\alpha_i$, $\beta_i$, $\gamma_{i,j}$) (1≤i, j≤N) is a model parameter and a constant, and N is the maximum number of occupants in the vehicle.

9. A program that allows at least one computer to execute the information processing method according to any one of 5 to 8.

The invention claimed is:

1. An information processing apparatus comprising:

a computation unit that analyzes a sensing result acquired by sensing a vehicle running on a road, and thereby computing a number of occupants in the vehicle and a certainty factor of the number of the occupants;

a selection unit that selects the sensing result with the computed certainty factor of the number of the occupants which does not satisfy a predetermined criterion as an analysis result; and a processing unit that allows the sensing result selected by the selection unit to be in a state of being distinguishable from another sensing result, wherein the computation unit computes a reliability in each of a plurality of cases in which a person has been determined as existing on a corresponding seat of a plurality of seats of the vehicle, and computes the certainty factor related to each case of a possible number of the occupants in the vehicle using the reliability for the corresponding seat.

2. The information processing apparatus according to claim 1, wherein the computation unit computes the reliability in each case for the respective seat using a plurality of images acquired by capturing using at least one imaging apparatus.

3. The information processing apparatus according to claim 1, wherein the computation unit computes the reliability in each case for the respective seat using a Bayesian belief network (BBN).

4. The information processing apparatus according to claim 1, wherein the computation unit converts a likelihood distribution into a certainty factor using Bayes' theorem, the likelihood distribution acquired using $$p(\vec{x}, n', \vec{\theta} \mid n) = \exp\left\{ -\frac{\alpha_n^2(n'-n)^2 + \beta_n^2}{\sum_{k=1}^{n} \gamma_{n,k}^2 x_k} \left(1 + \sum_{k=n+1}^{N} \gamma_{n,k}^2 x_k\right) \right\}, \quad (1)$$

wherein n is a true value of the number of the occupants in the vehicle, n' is the number of the occupants in the vehicle computed by the computation unit, x (where an arrow representing a vector is omitted) is the reliability in each case for the respective seat, θ (where the arrow representing the vector is omitted)=($\alpha_i$, $\beta_i$, $\gamma_{i,j}$) (1≤i, j≤N) is a model parameter and a constant, and N is a maximum number of the occupants in the vehicle.

5. An information processing method executed by at least one computer, the method comprising:

analyzing a sensing result acquired by sensing a vehicle running on a road, and thereby computing a number of occupants in the vehicle;

computing a reliability in each of plurality of cases case in which a person has been determined as existing on a corresponding seat of a plurality of seats of the vehicle;

computing a certainty factor related to each case of a possible number of the occupants in the vehicle using the reliability for the corresponding seat;

selecting the sensing result with the computed certainty factor of the number of the occupants which does not satisfy a predetermined criterion as an analysis result; and allowing the selected sensing result to be in a state of being distinguishable from another sensing result.

6. A non-transitory computer readable medium storing a program that allows at least one computer to execute an information processing method, the method comprising:

analyzing a sensing result acquired by sensing a vehicle running on a road, and thereby computing a number of occupants in the vehicle;

computing a reliability in each of plurality of cases case in which a person has been determined as existing on a corresponding seat of a plurality of seats of the vehicle;

computing a certainty factor related to each case of a possible number of the occupants in the vehicle using the reliability for the corresponding seat;

selecting the sensing result with the computed certainty factor of the number of the occupants which does not satisfy a predetermined criterion as an analysis result; and allowing the selected sensing result to be in a state of being distinguishable from another sensing result.

* * * * *